US011796516B2

United States Patent
Leveille et al.

(10) Patent No.: US 11,796,516 B2
(45) Date of Patent: Oct. 24, 2023

(54) ESTABLISHING FLUIDIC CONNECTIONS BETWEEN CHROMATOGRAPHY COMPONENTS

(71) Applicant: Waters Technologies Corporation, Milford, MA (US)

(72) Inventors: Wade P. Leveille, Douglas, MA (US); Joseph D. Michienzi, Plainville, MA (US); Joseph D. Antocci, Leominster, MA (US); Jeffrey Musacchio, Sharon, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 115 days.

(21) Appl. No.: 17/239,813

(22) Filed: Apr. 26, 2021

(65) Prior Publication Data
US 2021/0341437 A1 Nov. 4, 2021

Related U.S. Application Data

(60) Provisional application No. 63/017,249, filed on Apr. 29, 2020.

(51) Int. Cl.
*G01N 30/60* (2006.01)
(52) U.S. Cl.
CPC ..... *G01N 30/6026* (2013.01); *G01N 30/6047* (2013.01)
(58) Field of Classification Search
CPC ........... G01N 30/6026; G01N 30/6047; G01N 30/6091
See application file for complete search history.

(56) References Cited

U.S. PATENT DOCUMENTS 6,074,556 A 6/2000 Van Davelaar
6,294,088 B1 9/2001 Allington et al.
(Continued)

FOREIGN PATENT DOCUMENTS

GB 2379487 A 3/2003
WO 2011020803 A1 2/2011
(Continued)

OTHER PUBLICATIONS

International Search Report and Written Opinion in PCT/US2021/029055 dated Jul. 29, 2021.
(Continued)

*Primary Examiner* — Francis C Gray
(74) *Attorney, Agent, or Firm* — Schmeiser, Olsen & Watts LLP; Victor J. Baranowski

(57) ABSTRACT

A clamp assembly includes a rail extending along the length and configured to receive a first fluidic assembly, and a carriage movably attachable to the rail such that the carriage moves along the rail, the carriage configured to receive a second fluidic assembly, the carriage including an actuator and a stop mechanism. The stop mechanism is configured to selectively prevent and allow movement of the carriage relative to the rail. The stop mechanism is configured to be independently operable from the actuator assembly, and the actuator is configured: to move a chromatography column received by the clamp assembly relative to the rail to create a first fluid tight seal between the chromatography column and the first fluidic assembly, and move the second fluidic assembly relative to the carriage body to create a second fluid tight seal between the second fluidic assembly and the chromatography column.

19 Claims, 13 Drawing Sheets

(56) References Cited

U.S. PATENT DOCUMENTS

| | | |
|---|---|---|
| 7,101,477 B1 | 9/2006 | Willis et al. |
| 10,338,038 B2 | 7/2019 | Kirby et al. |
| 2006/0008390 A1 | 1/2006 | Prentice et al. |
| 2007/0084982 A1* | 4/2007 | Martone ............ G01N 30/6047 248/316.8 |
| 2007/0158942 A1 | 7/2007 | Keene |
| 2010/0154207 A1 | 6/2010 | Ford et al. |
| 2011/0259827 A1 | 10/2011 | Belanger et al. |
| 2019/0271670 A1* | 9/2019 | Kirby ...................... G01N 30/02 |
| 2020/0025727 A1* | 1/2020 | Hasegawa .......... G01N 30/6039 |
| 2020/0386725 A1* | 12/2020 | Ozbal ................. G01N 30/606 |

FOREIGN PATENT DOCUMENTS

| | | |
|---|---|---|
| WO | 2011085341 A1 | 7/2011 |
| WO | 2011085359 A1 | 7/2011 |
| WO | 2012058513 A1 | 5/2012 |
| WO | 2013095964 A2 | 6/2013 |

OTHER PUBLICATIONS

International Preliminary Report on Patentability in PCT/US2021/029055 dated Nov. 10, 2022.

* cited by examiner

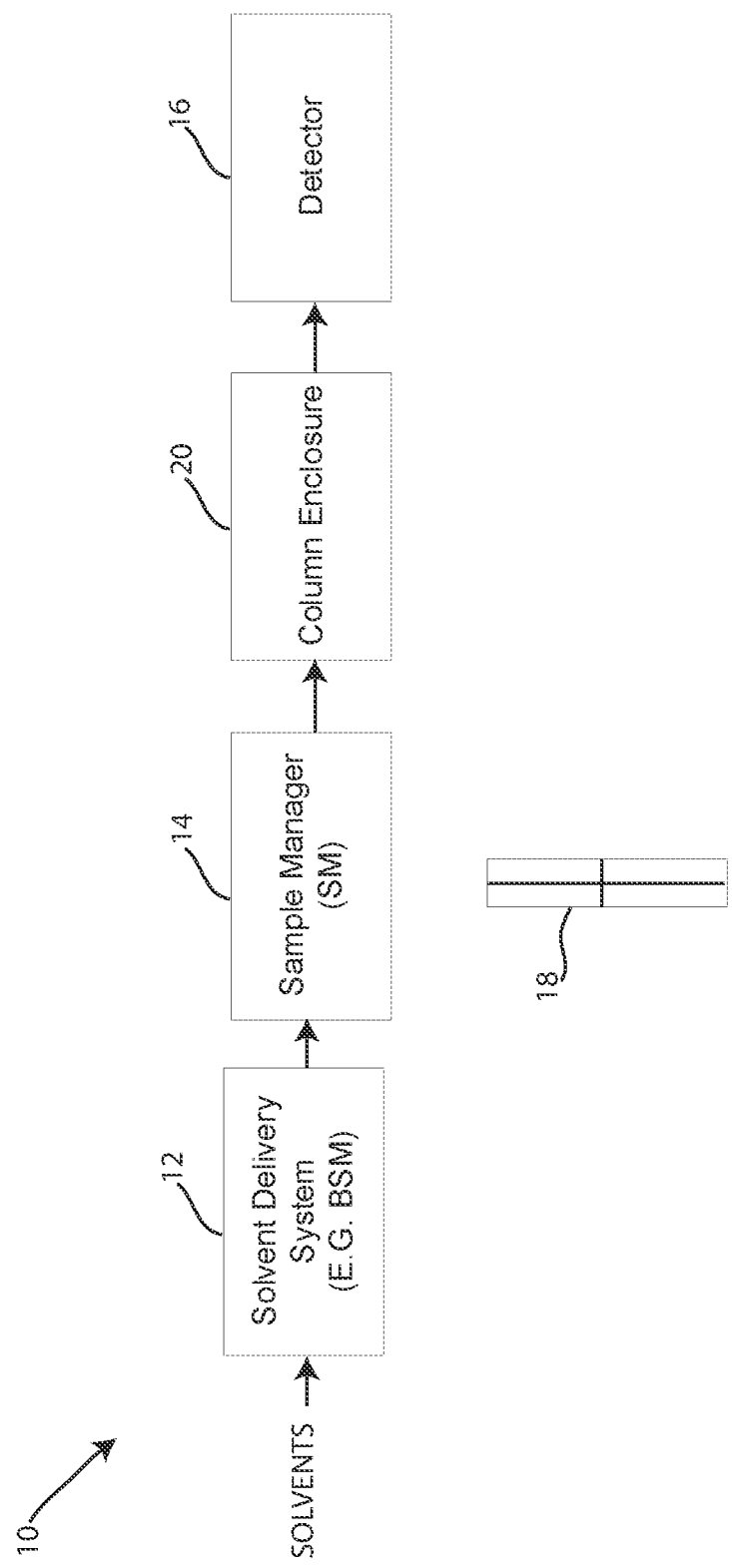

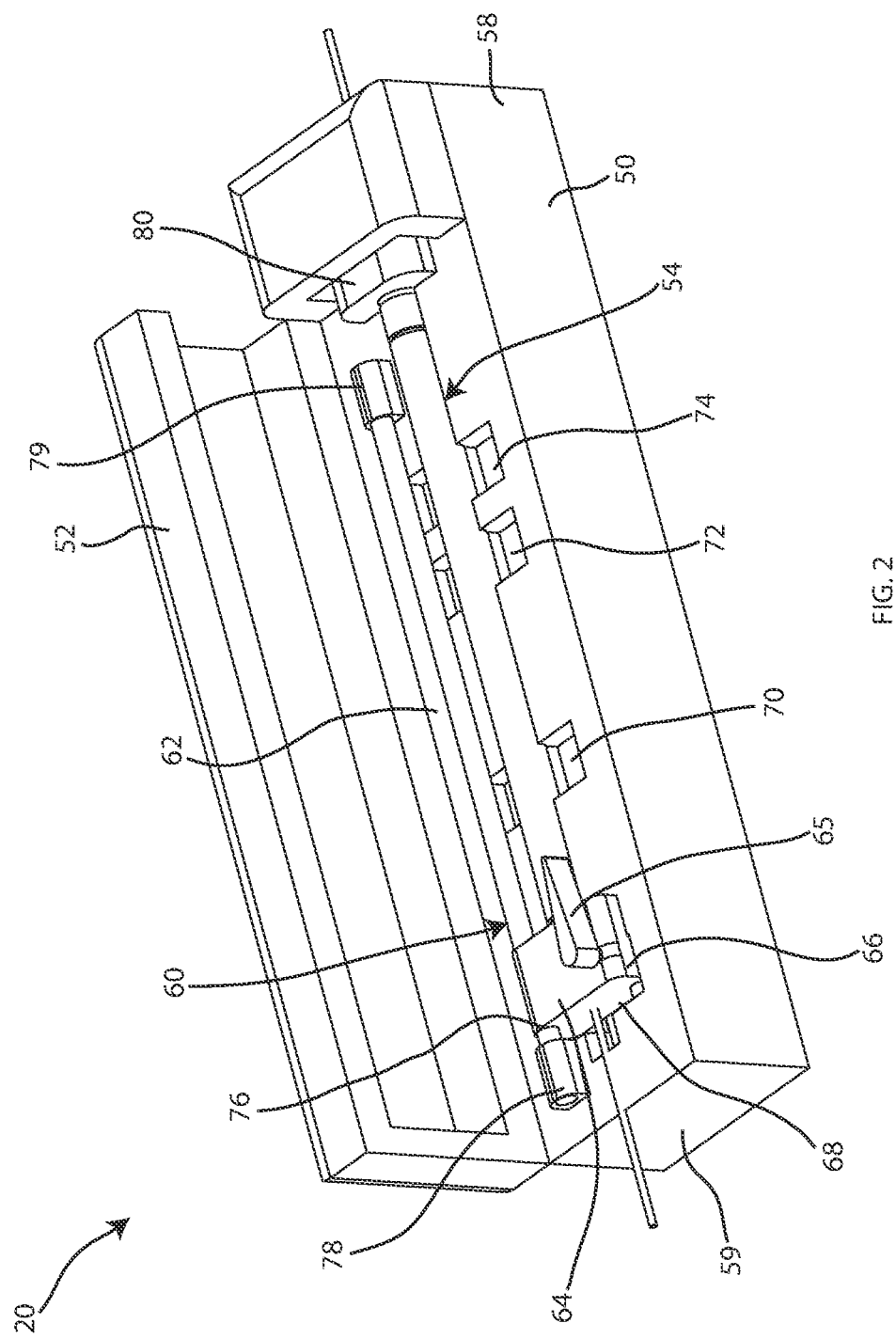

ESTABLISHING FLUIDIC CONNECTIONS BETWEEN CHROMATOGRAPHY COMPONENTS

RELATED APPLICATION

This application claims the benefit of the earlier filing date of U.S. Provisional Patent Application Ser. No. 63/017,249 filed Apr. 29, 2020 and titled "Establishing Fluidic Connections between Chromatography Components," the entirety of which is incorporated herein by reference.

TECHNICAL FIELD

This disclosure relates to establishing fluidic connections between chromatography components. In particular, the disclosure relates to devices and methods for establishing a fluidic connection of a chromatography column into a chromatography and/or mass spectrometry system.

BACKGROUND

Chromatography is a set of techniques for separating a mixture into its constituents. Generally, in a liquid chromatography analysis, a pump system takes in and delivers a mixture of liquid solvents (and/or other fluids) to a sample manager, where a sample awaits injection into the solvents. The sample is the material under analysis. Examples of samples include complex mixtures of proteins, protein precursors, protein fragments, reaction products, and other compounds, to list but a few. In an isocratic chromatography application, the composition of the liquid solvents remains unchanged, whereas in a gradient chromatography application, the solvent composition varies over time. The mobile phase, comprised of a sample dissolved in a mixture of solvents (and/or other fluids), moves to a point of use, such as a column, which includes a packing material referred to as the stationary phase.

By passing the mobile phase through the column, the various components in the sample separate from each other at different rates and thus elute from the column at different times. A detector receives the separated components from the column and produces an output from which the identity and quantity of the analytes may be determined. Temperature can influence the results of the analysis, affecting such properties as the separation performance of the column and the viscosity of a mobile phase. Therefore, maintaining an accurate constant column temperature can be important to the accuracy and reproducibility of the results.

Systems used for performing chromatography analysis often include fluidic tubing for providing fluid communication between system components. For example, chromatography systems typically include components, such as pumps, valves, columns, and detectors, that are connected together through fluidic (e.g., metallic or polymeric) tubing. The system components and the fluidic tubing are often connected using threaded fittings or bayonet fittings. Connection and disconnection of these fittings (e.g., during assembly, repair, and/or replacement) can require application of torque, e.g., by hand alone or with the use of tools, to establish a fluid tight connection. This can be time consuming, cumbersome (e.g., in cases in which multiple turns are required), and may lead to leaks and/or failure if the fittings are not threaded together properly and/or if adequate torque is not applied when the connection is made.

In modern chromatography, systems pressures are being increased and internal fluid volumes are being reduced. As a result, the reliability and seal characteristics of conventional fittings are becoming problematic. As the pressure is raised and the system internal fluid volume is reduced the fitting dead volume and sensitivity to the assemblers skill become impediments to chromatographic quality. In this regard, establishing fluid tight connections with such conventional fittings can require the use of skilled labor employing since it is often the case that a high degree of precision is required to ensure the connection is not only fluid tight, but is also devoid of undesirable dead volume which can lead to lost precision in the measured data.

Establishing fluid tight connections with skilled labor typically requires the use of tools. These types of connections may be difficult to establish, even with the aid of tools. Even with tools and a skilled technician, it may be tedious to complete and easy to get wrong. In particular, the installation of a chromatography column into a chromatography and/or mass spectrometry system can lead to questions regarding proper positioning and orientation, as well as whether the installation was done properly. The present invention also seeks to improve existing known techniques for establishing these connections without the use of hand tools, such as the clamp assembly described in U.S. Pat. No. 10,338,038, entitled "Establishing Fluidic Connections between Chromatography Components."

SUMMARY

In accordance with one embodiment, a column enclosure for a chromatography column comprises: a column housing extending along a length; a rail extending along the length within the column housing; a carriage movably attachable to the rail such that the carriage moves along the rail, the carriage including an actuator and a stop mechanism; a first fluidic assembly configured to be moved by the actuator into engagement with a chromatography column received within the column housing; and a second fluidic assembly located proximate an end of the rail; wherein the stop mechanism is configured to selectively prevent and allow movement of the carriage relative to the rail, wherein the stop mechanism is configured to be independently operable from the actuator, and wherein the actuator is configured: to establish a first fluid tight seal between the first fluidic assembly and the chromatography column; and to establish a second fluid tight seal between the second fluidic assembly and the chromatography column.

Additionally or alternatively, the stop mechanism includes a projection on the carriage keyed to a plurality of separate locations along the rail, each of the plurality of separate locations corresponding to standard lengths of chromatography columns.

Additionally or alternatively, the rail is a guide rod and wherein the carriage includes a bore through which the guide rod extends, wherein the carriage is configured to be rotated about the guide rod to move the carriage into and out of the plurality of separate locations along the rail.

Additionally or alternatively, the actuator is a hand operated cam loaded lever.

Additionally or alternatively, the rail includes a first plurality of teeth arranged along the length, and wherein the stop mechanism includes a first lock pawl that is configured to engage the teeth of the rail, thereby to inhibit movement of the carriage relative to the rail.

Additionally or alternatively, the rail includes a second plurality of teeth arranged along the length on an opposite side of the first plurality of teeth, and wherein the stop mechanism includes a second lock pawl on an opposite side of the carriage as the first lock pawl, wherein the first and second lock pawls are each configured to engage the teeth of the rail, thereby to inhibit movement of the carriage relative to the rail.

Additionally or alternatively, a spring extends between each of the first and second lock pawls to maintain locking of the stop mechanism.

Additionally or alternatively, the lock pawls are configured to be squeezed by hand to release to stop mechanism from the first and second plurality of teeth of the rail and thereby allow movement of the carriage with respect to the rail.

Additionally or alternatively, the column enclosure accommodates chromatography columns having at least one of various column lengths and various column diameters.

In accordance with another embodiment, a clamp assembly comprises: a rail extending along the length and configured to receive a first fluidic assembly; and a carriage movably attachable to the rail such that the carriage moves along the rail, the carriage configured to receive a second fluidic assembly, the carriage including an actuator and a stop mechanism, where the stop mechanism is configured to selectively prevent and allow movement of the carriage relative to the rail, wherein the stop mechanism is configured to be independently operable from the actuator assembly, and wherein the actuator is configured: to move a chromatography column received by the clamp assembly relative to the rail to create a first fluid tight seal between the chromatography column and the first fluidic assembly, and move the second fluidic assembly relative to the carriage body to create a second fluid tight seal between the second fluidic assembly and the chromatography column.

Additionally or alternatively, the stop mechanism includes a projection on the carriage keyed to a plurality of separate locations along the rail, each of the plurality of separate locations corresponding to standard lengths of chromatography columns.

Additionally or alternatively, the rail is a guide rod and wherein the carriage includes a bore through which the guide rod extends, wherein the carriage is configured to be rotated about the guide rod to move the carriage into and out of the plurality of separate locations along the rail.

Additionally or alternatively, the actuator is a hand operated cam loaded lever.

Additionally or alternatively, the rail includes a first plurality of teeth arranged along the length, and wherein the stop mechanism includes a first lock pawl that is configured to engage the teeth of the rail, thereby to inhibit movement of the carriage relative to the rail.

Additionally or alternatively, the rail includes a second plurality of teeth arranged along the length on an opposite side of the first plurality of teeth, and wherein the stop mechanism includes a second lock pawl on an opposite side of the carriage as the first lock pawl, wherein the first and second lock pawls are each configured to engage the teeth of the rail, thereby to inhibit movement of the carriage relative to the rail.

Additionally or alternatively, a spring extends between each of the first and second lock pawls to maintain locking of the stop mechanism.

Additionally or alternatively, the lock pawls are configured to be squeezed by hand to release to stop mechanism from the first and second plurality of teeth of the rail and thereby allow movement of the carriage with respect to the rail.

Additionally or alternatively, the carriage accommodates chromatography columns having at least one of various column lengths and various column diameters.

In accordance with another embodiment, a method of establishing fluid tight seals comprises: receiving a first chromatography column by a clamp assembly; moving a carriage along a rail of the clamp assembly into a first position that corresponds to a length of the first chromatography column, the carriage including an actuator and a stop mechanism; preventing movement, by the stop mechanism of the carriage, of the carriage relative to the rail at the first position; after the preventing movement, engaging the actuator of the carriage; by the engaging of the actuator, establishing a first fluid tight seal between the first fluidic assembly and the first chromatography column; and by the engaging of the actuator, establishing a second fluid tight seal between the second fluidic assembly and the first chromatography column.

Additionally or alternatively, the method further includes releasing the stop mechanism of the carriage; moving the carriage along the rail of the clamp assembly; removing the first chromatography column from the clamp assembly; receiving a second chromatography column by a clamp assembly; moving the carriage along the rail of the claim assembly to a second position that corresponds to a length of the second chromatography column; preventing movement, by the stop mechanism of the carriage, of the carriage relative to the rail at the second position; after the preventing movement, engaging the actuator of the carriage; by the engaging of the actuator, establishing a third fluid tight seal between the first fluidic assembly and the second chromatography column; and by the engaging of the actuator, establishing a fourth fluid tight seal between the second fluidic assembly and the second chromatography column.

BRIEF DESCRIPTION OF THE DRAWINGS

FIG. 1 depicts a functional block diagram of a liquid chromatography system including a column-heater enclosure having a column enclosure, in accordance with one embodiment.

FIG. 2 depicts a perspective view of a column enclosure with a front door opened, in accordance with one embodiment.

DETAILED DESCRIPTION

Figure 3A:
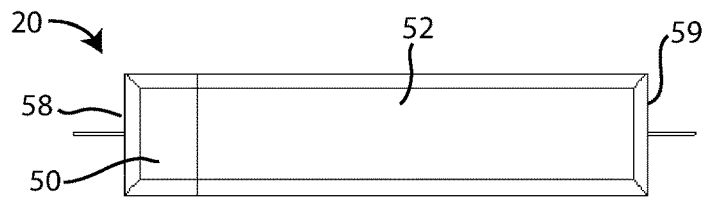
FIG. 3A depicts a top view of the column enclosure of FIG. 3 with the front door closed in accordance with a first step of a method of changing a chromatography column, in accordance with one embodiment.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

This disclosure arises, in part, from the realization that apparatus can be provided for connecting chromatography columns without the use of hand tools (e.g., wrenches) or ferrules in such a way as to inhibit (e.g., prevent) carry-over, dispersion, or dead volume. In some cases, a fluid tight connection (e.g., up to at least 20,000 pounds per square inch) is provided which does not require the application of torque, such as is typical of conventional fluid fittings having threaded or bayonet connections, and/or which can allow for a quick and highly repeatable connection that does not require highly skilled operators to ensure that the connection is properly established. Further, it has been found that such an apparatus should be capable of accommodating different sized chromatography columns, thereby requiring a moving carriage part for making such accommodations. This disclosure further arises from the realization that such a carriage requires significant stability prior to actuating the connection with chromatography columns.

Systems described herein include apparatus for connecting fluidic tubing to a chromatography column to establish a fluid tight connection therebetween. The apparatus can provide a quick and highly repeatable fluid tight connection that does not require highly skilled operators to ensure that the connection is properly established. The apparatus allows for chromatography columns to be connected without the use of tools or ferrules and in such a way as to inhibit carry-over, dispersion, and dead volume. Various implementations of these systems relate to liquid-chromatography apparatus, for example, HPLC (High Performance Liquid Chromatography) and UPLC (Ultra Performance Liquid Chromatography) systems coupled to a mass spectrometer detection system. Further, the apparatus includes a carriage having a connection actuator that is separate from a carriage movement stop mechanism. This allows for the carriage to remain stable prior to initiation of the connection actuator and establishing fluidic connections with a chromatography column.

FIG. 1 shows an implementation of a liquid chromatography system 10 for separating a sample into its constituents. The liquid chromatography system 10 includes a solvent delivery system 12 in fluidic communication with a sample manager 14. Generally, the solvent delivery system 12 includes pumps (not shown) in fluidic communication with solvent reservoirs from which the pumps draw solvents. The solvent delivery system 12 delivers a mixture of solvents to the sample manager 14. The sample manager 14 is in fluidic communication with a sample source 18 from which the sample manager acquires and introduces a sample to the solvent mixture arriving from the solvent delivery system 12.

In fluidic communication with the sample manager 14 is a column enclosure 20 for providing a controlled temperature environment for a chromatography column used in separating sample-solvent compositions. As described herein, the column enclosure 20 includes a fluidic coupling apparatus for establishing fluidic connections between chromatography components (e.g., between fluidic tubing and the chromatography column). From the column enclosure 20, the constituents of the separated sample pass to a detector 16 or other equipment, for example, a mass spectrometer, for analyzing the separation. In one implementation, the liquid chromatography system 10 is a modified ACQUITY UPLC System the ACQUITY UPLC system available from Waters Corporation of Milford MA.

FIG. 2 depicts a perspective view of the column enclosure 20, in accordance with one embodiment. The column enclosure 20 includes a column housing 50. While not shown, the column enclosure 20 may further include an electronics housing coupled to the column housing. The electronics housing may be configured to control various features of the column enclosure 20 such as a column heater and/or a column pre-heater system 80.

The column housing 50 further includes a front door 52 coupled to the column housing 50 along its length by a hinge. Opposite the hinge may be a mechanical latch (not shown) for closing the front door 52 of the column housing 50. The column enclosure 20 may incorporate various features of known column enclosures, such as an electrical device used to read identification from chromatography columns. As another example, the front door 52 may incorporate a magnetic switch located at the hinge end to detect when a connection is broken (i.e. when the front door 52 opens). The column enclosure 20 may use signals from such a switch to determine whether to maintain or disconnect power to the active pre-heater assembly 80 installed within the column enclosure 20.

The interior of the column housing 50 includes a trough 54 within which a chromatography column 56 is shown after having been fluidically connected into the column enclosure 20. The trough 54 may be configured to receive and accommodate chromatography columns having different lengths and diameters.

The column housing 50 of the column enclosure 20 extends along a length between a column inlet end 59 and a column outlet end 58. A clamp assembly 60 is located within the column housing 50 including both a rail 62 and a carriage 64 having a hand operated cam loaded lever 65. The rail 62 extends along the length of the housing. In the embodiment shown, the rail 62 is in the form of a guide rod that extends parallel to the chromatography column 56 within the column housing 50. A carriage 64 is shown movably attachable to the rail 62 such that the carriage 64 may move along the rail 62, where the movement is confined to one dimension or axis by the attachment with the rail 62. The underside of the carriage 64 includes a projection 66 that is keyed to a plurality of separate cavities 68, 70, 72, 74 disposed along the length of the trough 54. The bottom of the carriage 64 is dimensioned to fit snugly into each of the cavities 68, 70, 72, 74 to retain the carriage 64 in a stable position during actuation of the carriage 64 to establish a fluidic connection. The carriage 64 further includes a bore 76 within which the rail 62 extends. As described in more detail hereinbelow, the carriage 64 is configured to be rotated about the rail 62 to move the carriage 64 into and out of the plurality of separate cavities 68, 70, 72, 74 located at predetermined locations along the length of the rail 62.

The various cavities 68, 70, 72, 74 located along the trough 54 may be particularly dimensioned at lengths along the trough 54 to accommodate standardized chromatography column lengths and/or dimensions. For example, the cavity 68 is shown located at a length within the trough 54 to accommodate a 150 mm column. The cavity 70 is shown located at a length within the trough 54 to accommodate a 100 mm column. Likewise, the cavity 68 is shown located at a length within the trough 54 to accommodate a 50 mm column. Finally, the cavity 74 is shown located at a length within the trough 54 to accommodate a 30 mm column.

The carriage 64 also includes the lever 65 that is attached to the carriage. The lever 65 may be cam loaded, which, when the clamp assembly 60 is in an engaged condition, engage a first fluidic assembly (not shown) received or otherwise within the carriage 64 to control movement of the first fluidic assembly relative to the body or frame of the carriage 64. In general, the clamp assembly 60 receives and retains the chromatography column 56 and establishes a fluid connection between a second fluidic assembly 80, such as an outlet to a detector or mass spectrometer, and the chromatography column 56, and between the first fluidic assembly found within the carriage 64 and the chromatography column 56.

The first fluidic assembly may, for example, be a needle barrel assembly, as described in International Patent Application No. PCT/US12/68712, filed Dec. 10, 2012, the complete disclosure of which is incorporated herein by reference to the extent it is not inconsistent with the present disclosure. Alternatively, the first fluidic assembly may be any other form of assembly configured to create a seal with an end of the chromatography column 56. While the carriage 64 is shown proximate the inlet end of the chromatography column 56 in the embodiment shown, the clamp assembly 60 may be configured for connecting a chromatography column 56 having a reversed orientation, as in International Patent Application No. PCT/US12/68712.

One of the fluidic assemblies may include an active preheater assembly, as described in International Patent Application No. PCT/US12/68712. The active pre-heater assembly may be fluidically connected to the sample manager 14 (FIG. 2) by way of an inlet capillary tubing. It should be understood that the clamp assembly 60 may be configured to clamp the chromatography column 56 into any other type of fluidic assembly, sealing mechanism (such as a needle barrel assembly), or the like.

Referring now to FIGS. 3A-3G, methods of connecting and disconnecting chromatography columns within the column enclosure 20 are shown. FIG. 3A depicts a top view of the column enclosure 20 of FIG. 2 with the front door 52 closed in accordance with a first step of a method of changing a chromatography column, in accordance with one embodiment.

Figure 3B:
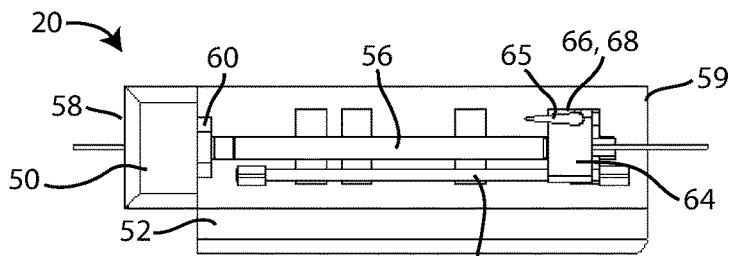
FIG. 3B depicts a top view of the column enclosure of FIG. 3 with the front door opened in accordance with a second step of a method of changing a chromatography column, in accordance with one embodiment.

FIG. 3B depicts a top view of the column enclosure 20 of FIG. 2 with the front door opened 54 in accordance with a second step of a method of changing a chromatography column, in accordance with one embodiment. As shown, the chromatography column 56 is a 150 mm chromatography column. Here, the lever 65 of the carriage 64 is in an engaged position while the protrusion 66 of the carriage 64 rests within the cavity 68, thereby holding the cavity 68 in place along the rail 62. The first fluidic assembly within the carriage 46 is engaged with the end of the chromatography column 56 to create a fluid tight seal therewith.

Figure 3C:
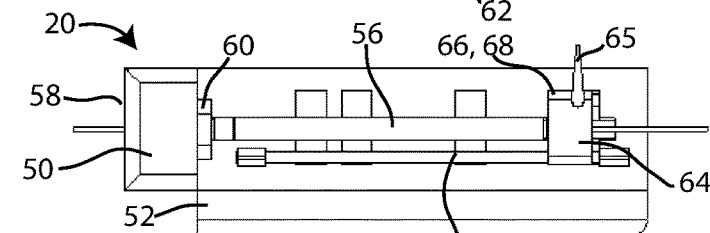
FIG. 3C depicts a top view of the column enclosure of FIG. 3 with the front door opened in accordance with a third step of a method of changing a chromatography column, in accordance with one embodiment.

FIG. 3C depicts a top view of the column enclosure 20 of FIG. 2 with the front door 52 opened in accordance with a third step of a method of changing a chromatography column, in accordance with one embodiment. Here, the lever 65 of the carriage 64 is in a released or disengaged position. Thus, the lever 65 of the clamp assembly 60 is displaceable between a disengaged position and the engaged position. The displacement of the lever 65 from the disengaged position to the engaged position displaces the first fluidic assembly, such as the above-described needle barrel assembly, such that, in the engaged position, the distal ends of the outlet needle protrude further outwardly from the carriage 64 toward the chromatography column 56. Disengagement in this manner allows the carriage 64 to become detached from the chromatography column 56 in order to facilitate removal and/or replacement of the chromatography column 56 from the column enclosure 20 and the trough 54 thereof.

Figure 3D:
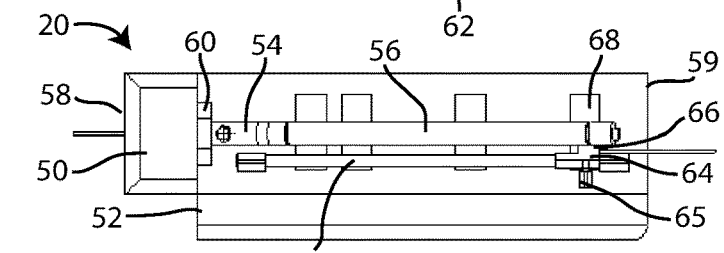
FIG. 3D depicts a top view of the column enclosure of FIG. 3 with the front door opened in accordance with a fourth step of a method of changing a chromatography column, in accordance with one embodiment.

FIG. 3D depicts a top view of the column enclosure 20 of FIG. 2 with the front door 52 opened in accordance with a fourth step of a method of changing a chromatography column, in accordance with one embodiment. In this step, the fully disengaged carriage 64 has been rotated about the rail 62. This frees the disengaged carriage 64 from engagement by the projection 66 into the cavity 68 and allows the carriage 64 to slide along the rail 62. Further, this rotation about the rail 62 allows the carriage 64 to allow the chromatography column 56 to move along the trough 54 toward the second end 59. This allows the chromatography column 56 to disengage from the seal with the active pre-heater assembly 60.

Figure 3E:
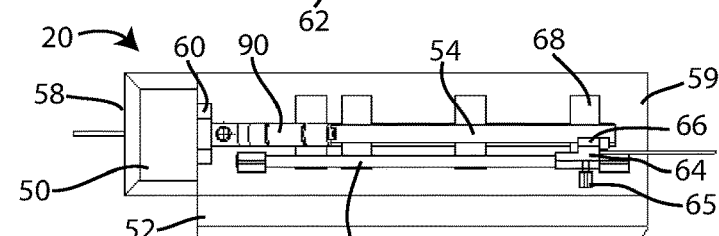
FIG. 3E depicts a top view of the column enclosure of FIG. 3 with the front door opened in accordance with a fifth step of a method of changing a chromatography column, in accordance with one embodiment.

FIG. 3E depicts a top view of the column enclosure 20 of FIG. 2 with the front door 52 opened in accordance with a fifth step of a method of changing a chromatography column, in accordance with one embodiment. Here, the chromatography column 56 has been removed and replaced by a second chromatography column 90. The second chromatography column 90 is a 30 mm column in length. As shown, the second column 90 is placed into the trough 54 in this step. The second column 90 is then slid towards the second fluidic assembly 80.

Figure 3F:
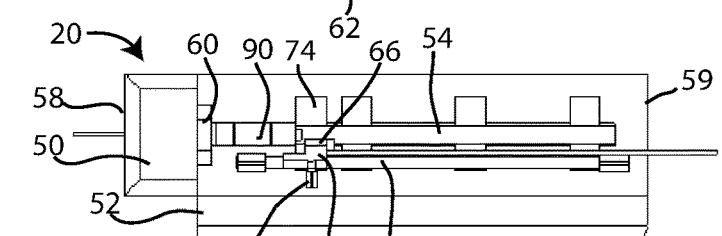
FIG. 3F depicts a top view of the column enclosure of FIG. 3 with the front door opened in accordance with a sixth step of a method of changing a chromatography column, in accordance with one embodiment.

FIG. 3F depicts a top view of the column enclosure 20 of FIG. 3 with the front door 52 opened in accordance with a sixth step of a method of changing a chromatography column, in accordance with one embodiment. In this step, the carriage 64 is slid towards the second chromatography column 90 until the carriage 64 is located at the 30 mm cavity 74 along the length of the rail 62. Here, the carriage 64 may then be rotated about the rail 62 so that the projection 65 of the carriage 64 enters into the cavity 74 to retain the carriage 64 in position along the rail 62. Once the carriage 64 is in this position, the carriage 64 may be positionally secured along the rail 62 and supported in a stable manner so that actuation can occur with sufficient leverage and the avoidance of movement of the carriage 64 along the length of the rail 62.

Figure 3G:
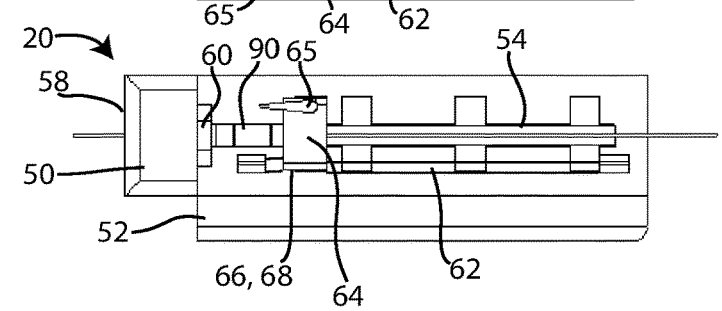
FIG. 3G depicts a top view of the column enclosure of FIG. 3 with the front door opened in accordance with a seventh step of a method of changing a chromatography column, in accordance with one embodiment.

FIG. 3G depicts a top view of the column enclosure 20 of FIG. 3 with the front door 52 opened in accordance with a seventh step of a method of changing a chromatography column, in accordance with one embodiment. Once the second chromatography column 90 and the carriage 64 are so positioned, the lever 65 is displaced from the disengaged position toward the engaged position. The lever 65 continues to rotate to cause the first fluidic assembly within the carriage 64 to transition toward the seal at the inlet end of the chromatography column 90.

Rotation of the lever 65 simultaneously, subsequently or additionally creates the seal between the second chromatography column 90 and the second fluidic assembly 80 at the outlet end of the second chromatography column 90. That is, the rotation of the lever 65 into the engaged position also establishes the fluidic seal in the same or similar manner between the second chromatography column 80 and the active pre-heater assembly 90.

The column enclosure 20 and clamp assembly 60 are capable of running at pressures of up to 20,000 pounds per square inch. This configuration can help to ensure repeatability of connection. This configuration can also help to ensure ease of connection, and helps to provide a fluid connection which does not require highly skilled operators to ensure that the connection is properly established. In addition, less mechanical force may be required to establish the fluid connections as compared to conventional threaded fittings or bayonet fittings which require application of torque, e.g., by hand alone or with the use of tools, to establish a fluid tight connection.

The column enclosure 20 and clamp assembly 60 has been described hereinabove with respect to a single embodiment. However, other embodiments are contemplated. Further, the clamp assembly 60 may be a separable component from the rest of the column enclosure 20, rather than integral thereto. Such a clamp assembly may include a trough with one or more cavities, along with a rail for guiding the lengthwise movement of a cartridge having a lever, and may be utilized in other column enclosures 20 or other chromatography system column chambers with different configurations and arrangements than the embodiment shown.

Figure 4:
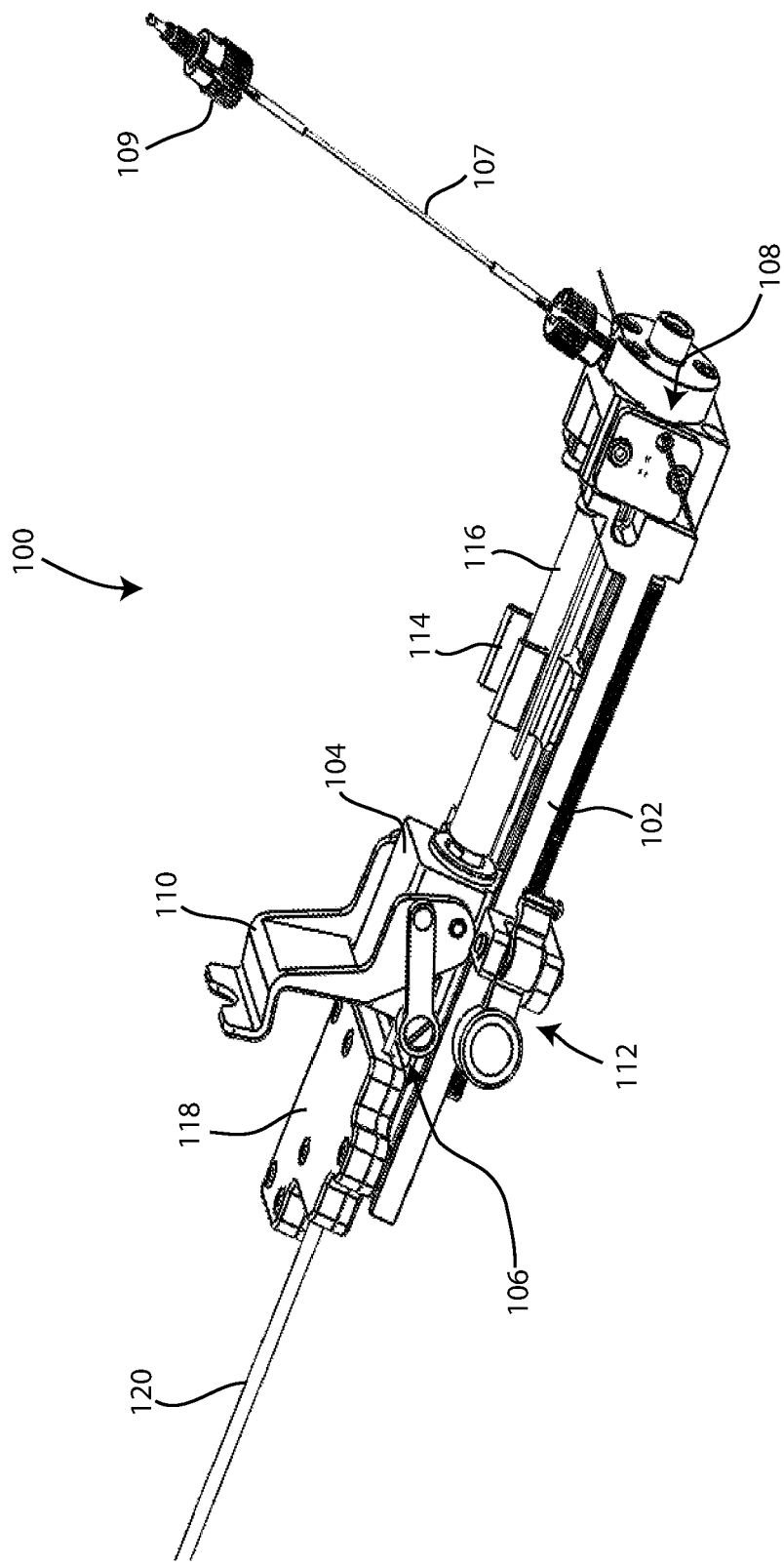
FIG. 4 depicts a perspective view of another clamp assembly for application within a column enclosure with a clamp lever in a released position, in accordance with another embodiment.
Figure 5:
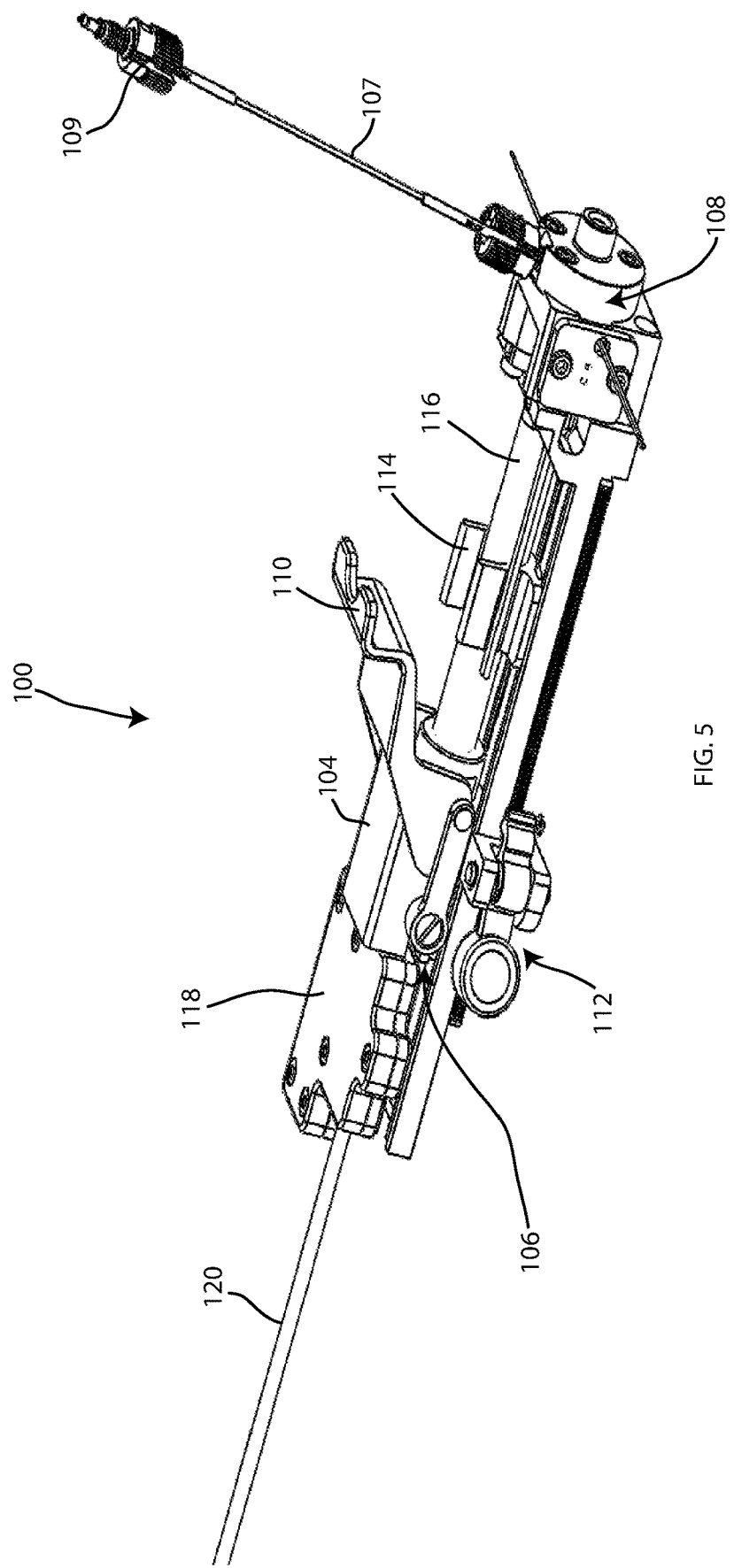
FIG. 5 depicts another perspective view of the clamp assembly of FIG. 4 with the clamp lever in a load position, in accordance with one embodiment.

FIG. 4 depicts a perspective view of another clamp assembly 100 for application within a column enclosure, such as the column enclosure 20, with a lever 110 in a released position in accordance with another embodiment. FIG. 5 depicts another perspective view of the clamp assembly 100 of FIG. 4 with the lever 110 in a load position, in accordance with one embodiment. The clamp assembly 100 herein includes a rail 102 extending along its length. The rail 102 may be configured to receive a first fluidic assembly 104 within a carriage 106. The carriage 106 may be movably attachable to the rail 102 such that the carriage 106 moves along the rail 102, the carriage 106 is configured to receive a second fluidic assembly 108. The carriage 106 includes the lever 110 and a stop mechanism 112.

The clamp assembly 100 may be configured with the same functionality and process for establishing fluidic seals at both ends of a chromatography column 116 as described hereinabove with respect to the clamp assembly 60. However, the clamp assembly 100 has a different mechanism for moving lengthwise along the rail 102, and for stopping lengthwise movement along the rail via the stop mechanism 112. The rail 102 includes a dual rail structure where the stop mechanism 112 includes an assembly that extends across to both sides of the rail 102. Further, the carriage 106 does not rotate about the rail 102 to engage with keyed cavities to provide for stability and prevent lengthwise movement. Instead the stop mechanism 112 of the clamp assembly 100 creates stability and prevents lengthwise movement via engagement of the stop mechanism 112 to a toothed track on each side of the dual rail structure, as described in more detail herein below. Further, the dual rail structure of the rail 102 further accommodates a sliding retainer clip 114 that includes a cylindrical opening within the clip dimensioned to receive the circumference of the chromatography column 116. This sliding retainer clip 114 can be slid along the rail 102 to accommodate chromatography columns of different lengths. The clip 114 can also be removed with a coin or other flat plate or the like. Such removal of the retainer clip 114 can allow for very short column lengths where the support provided by the clip 114 is unnecessary.

As shown, the first fluidic assembly 104 is proximate an inlet port of the chromatography column 116 while the second fluidic assembly 108 is proximate an outlet port of the chromatography column 116. Like the embodiment above, the second fluidic assembly 108 may include system for connecting to a solvent tubing 107 which extends to a fitting 109. The solvent tubing 107 may be configured to provide post-column addition of solvents to the system, prior to detection. The second fluidic assembly 108 further includes an outlet port in parallel with the column that is connectable to a fluidic channel (not shown) which brings fluid from the column to a mass spectrometer (not shown). It should be understood that in such an arrangement, the post column additional solvent tubing 107 is an option and not required.

The inlet port includes an inlet heater 118 through which an inlet tube 120 provides fluid that has passed through the chromatography column 116 to the downstream portion of the fluidic system.

Figure 6:
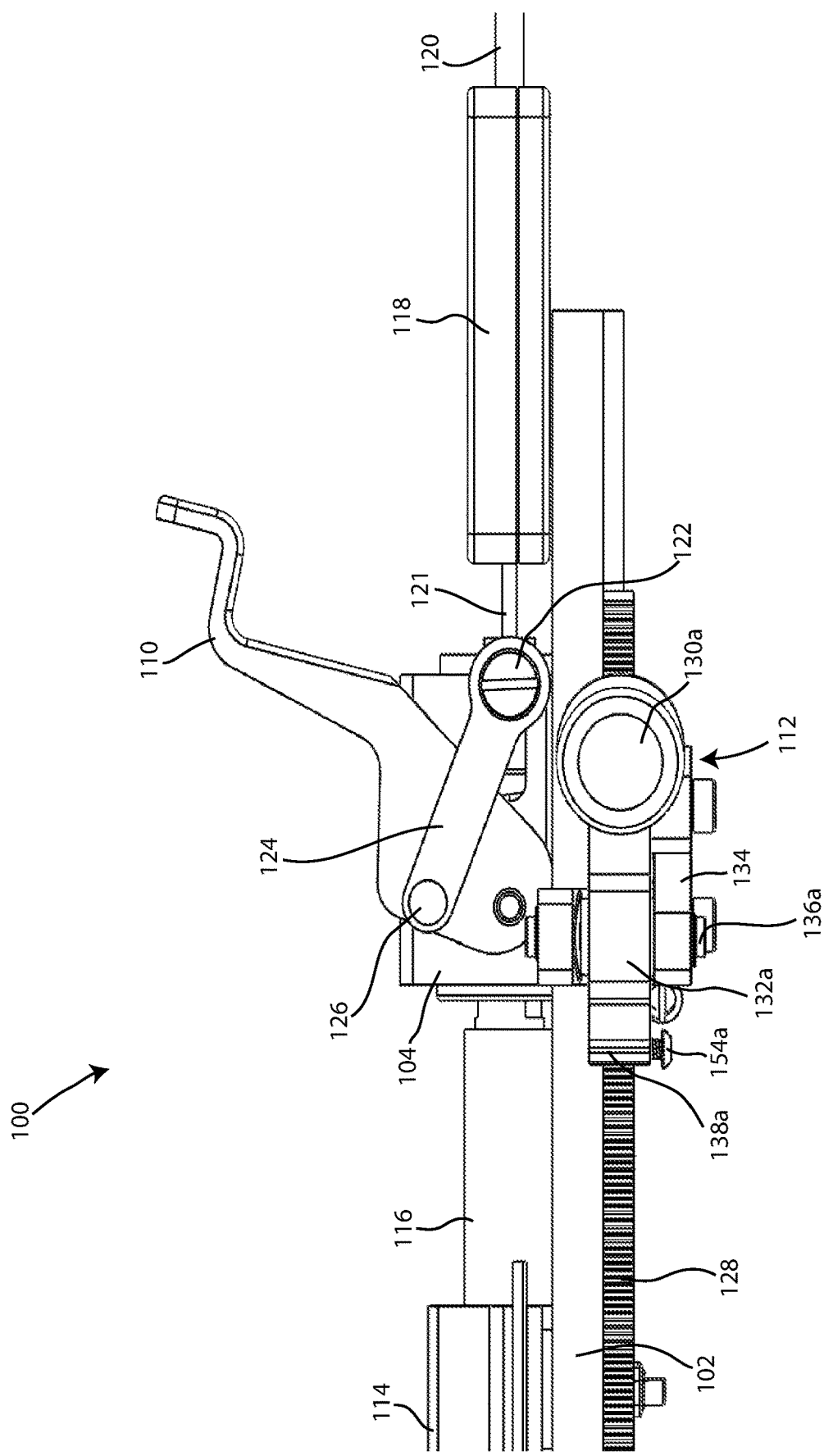
FIG. 6 depicts a side view of the clamp assembly of FIGS. 4-5 with a clamp lever in a released position, in accordance with one embodiment.

FIG. 6 depicts a side view of the clamp assembly 100 of FIGS. 4-5 with the lever 110 in a released position, in accordance with one embodiment. In the released position the lever 110 is positioned upward and a space exists between the first fluidic assembly 104 and the outlet end of the chromatography column 116. As shown, the lever 110 includes an arm 124 extending between a first pin 122 and a second pin 126. Further, the rail 102 is shown including an array of teeth 128 extending along its length. While only one side of the dual rail structure is shown, the rail 102 includes an opposing side that includes the same structure as the side shown. As shown, an inlet fluidic tubing 120 enters the inlet heater 118 and exits the inlet heater 118 through tubing 121. Tubing 121 transfers fluid into the first fluidic assembly 104 which is configured to be moved by actuation and/or rotation of the lever 110.

The stop mechanism 112 is shown including a hand button 130a for rotating a position retaining pawl 132a about a vertical pin 136a. A frame 134 extends underneath between each side of the dual rail structure of the rail 102. The frame 134 includes a C-shaped structure on each side (shown more clearly in FIGS. 4-5). The C-shaped structure includes openings in the top and bottom, which receive vertical pin 136a. The retaining pawl 132a is configured to rotate about the vertical pin 136a. The retaining pawl 132a includes the hand button 130a. When the button 130a is pressed, the respective pawl 132a rotates about the vertical pin 136a to release engagement arm 138a, having an array of locking teeth 140a for engagement with the array of teeth 128 disposed along the rail 102. When the button 130a, is pressed, this allows the carriage 106 to slide along the rail 102.

Figure 7:
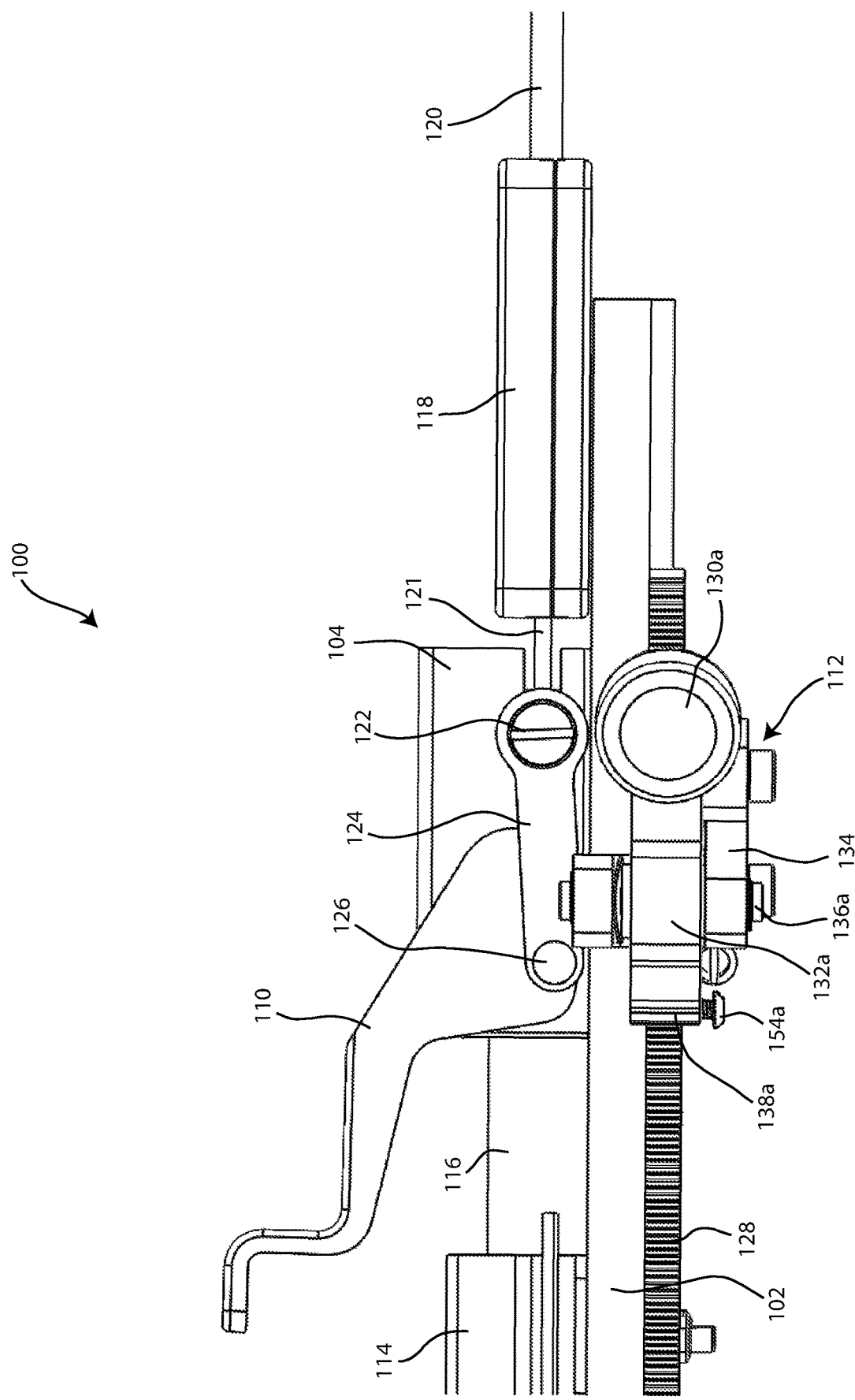
FIG. 7 depicts a side view of the clamp assembly of FIGS. 4-6 with the clamp lever in a load position, in accordance with one embodiment.

FIG. 7 depicts a side view of the clamp assembly 100 of FIGS. 4-6, in accordance with one embodiment. Unlike the state shown in FIG. 6, the lever 110 in FIG. 7 has been rotated into a load position. Specifically, the lever 110 has been rotated counter-clockwise about the pin 126. This rotating action may be accomplished by a technician by hand. Actuating the lever 110 brings the first fluidic assembly 104 into contact with the outlet end of the chromatography column 116, thereby creating a fluid tight seal therewith.

Figure 8:
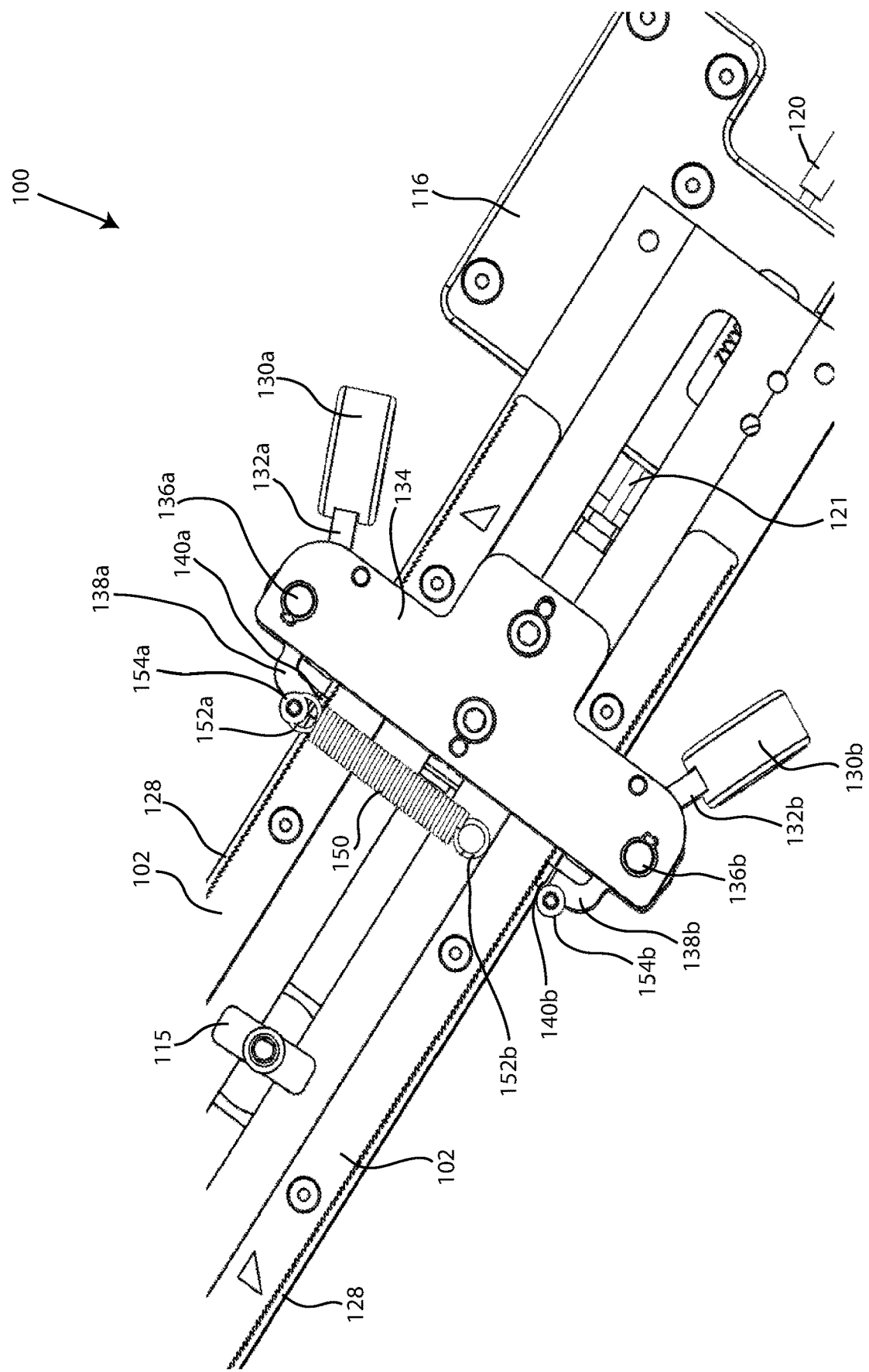
FIG. 8 depicts a perspective view of an underside of the clamp assembly of FIGS. 4-7 with position retaining pawls in a locked position, in accordance with one embodiment.
Figure 9:
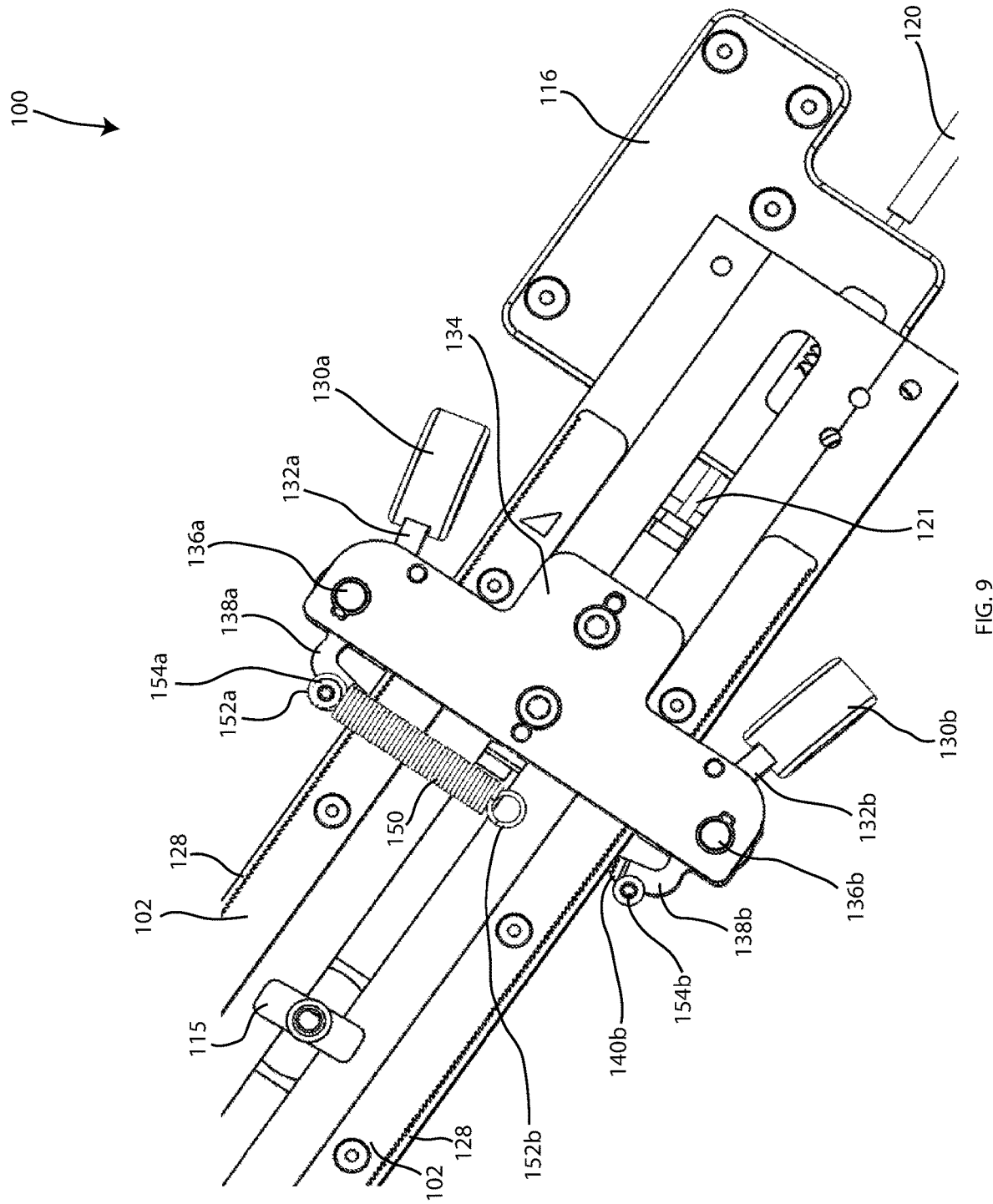
FIG. 9 depicts a perspective view of an underside of the clamp assembly of FIGS. 4-8 with position retaining pawls in a released position, in accordance with one embodiment.

FIG. 8 depicts a perspective view of an underside of the clamp assembly 100 of FIGS. 4-7 with position retaining pawls 132a, 132b in a locked position, in accordance with one embodiment. FIG. 9 depicts a perspective view of an underside of the clamp assembly 100 of FIGS. 4-8 with position retaining pawls 132a, 132b in a released position, in accordance with one embodiment. As shown, the retaining locking mechanism described hereinabove with respect to one side including the button 130a, retaining pawl 132a, vertical pin 136a, release engagement arm 138a, and locking teeth 140a is also included on the other side. Specifically, the opposing side of the rail 102 includes a corresponding button 130b, a retaining pawl 132b, a vertical pin 136a, a release engagement arm 138a, and locking teeth 140b.

Figure 10:
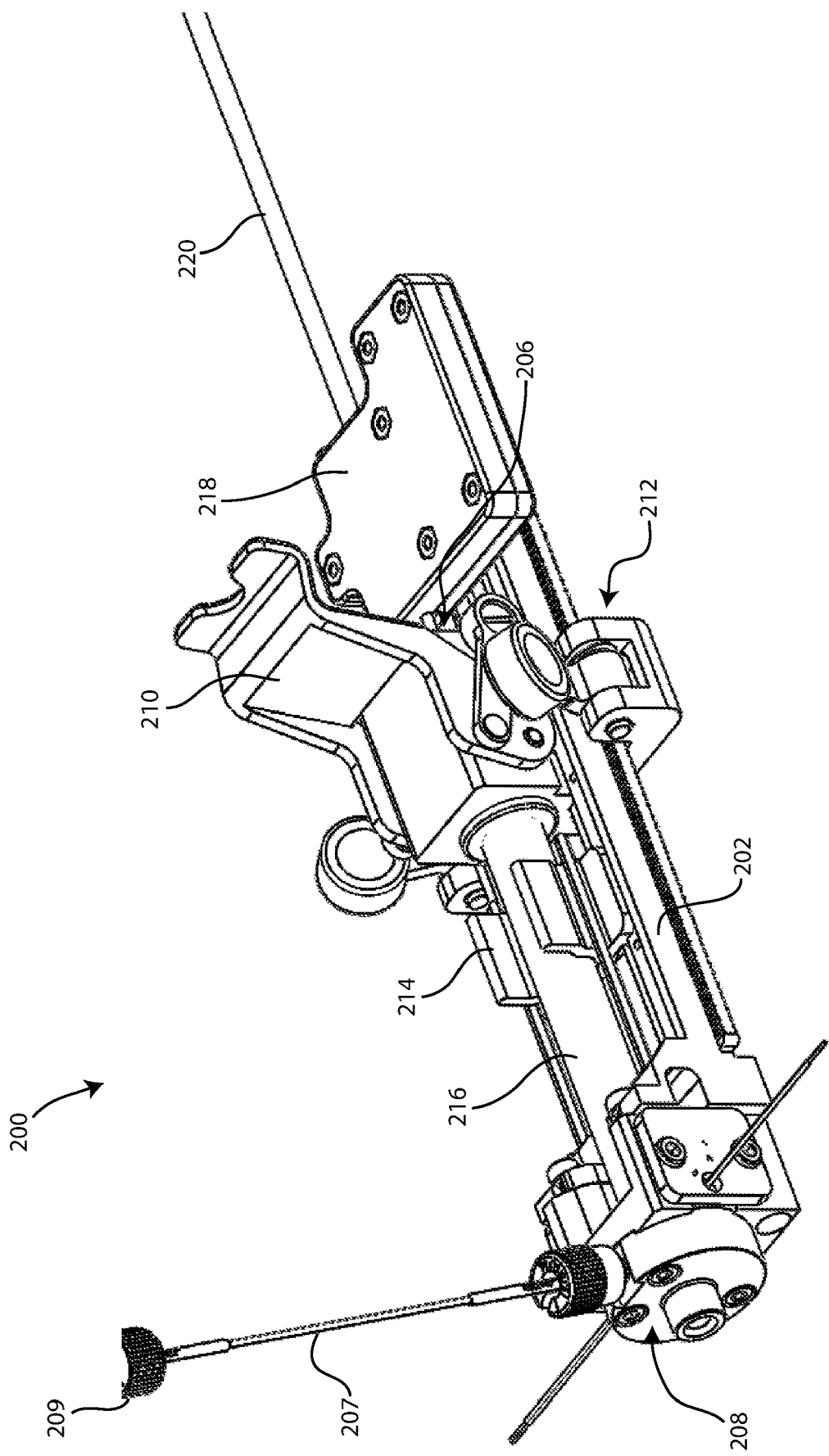
FIG. 10 depicts a perspective view of another clamp assembly for application within a column enclosure with a clamp lever in a released position, in accordance with another embodiment.

The respective engagement arms 138a, 138b each include a respective vertical bolt 154a, 154b extending therethrough. A spring 150 extending between endrings 152a, 152b is located between the vertical bolts 154a, 154b. In particular, the endrings 152a, 152b of the spring 150 may each be inserted into the vertical bolts 154a, 154b prior to the vertical bolts 154a, 154b being inserted into threaded vertical openings of the engagement arms 138a, 138b, as shown in FIG. 10. FIGS. 8-9 show one side of the spring 150 connected in this manner, but it should be understood that in operation of the clamp assembly 100, both sides are connected. The spring 150 is configured to pull the array of locking teeth 140a, 140b of each of the engagement arms 138a, 138b into engagement with the array of teeth 128 of each side of the rail 102. This may provide for selective movement or movement prevention of the carriage 106 along the rail 102. To move the carriage 106 along the rail 102, a technician may press the buttons 130a, 130b to expand the spring 150 and release the locking teeth 140a, 140b of the arms 138a, 138b from the array of teeth 128 of the rail 102. Then, to stop movement of the carriage 106 along the rail 102, a user would release the buttons 130a, 130b which causes the spring 150 to contract, thereby re-engaging the teeth 140a, 140b with the teeth 128 of the rail 102. This stop mechanism for preventing movement of the rail may be configured to act independently of the actuation of the lever 110. Thus, the carriage 106 may be stopped from movement along the rail 102 before the lever 110 is actuated.

Further, as shown in FIGS. 8-9, the sliding retainer clip 114 is held between the rail 102 through a clamp mechanism 115 that includes bolt extending through a flat thin plate extending on both sides of the bolt to each of the sides of the rail 102. The plate may be spring loaded to maintain tension. The plate and bolt create the clamp 115 configured to selectively loosen and tighten the sliding retainer clip 114 to allow the retainer clip 114 to be positioned along the rail 102 in accordance with the size of the column is being accommodated by the clamp assembly 100.

Referring now to FIG. 10, another clamp assembly 200 is shown for application within a column enclosure, such as the column enclosure 20, with a lever 210 in a released position in accordance with another embodiment. The clamp assembly 200 may be similar to the clamp assembly 100 described hereinabove. Similar to the clamp assembly 100, the clamp assembly 200 includes the lever 210 configured to operably move a first fluidic assembly 204 into engagement with a chromatography column 214 and further to push the chromatography column 214 into a fluidic seal with the second fluidic assembly 208. Like the embodiment above, the second fluidic assembly 208 may include system for connecting to a solvent tubing 207 which extends to a fitting 209. The solvent tubing 207 may be configured to provide post-column addition of solvents to the system, prior to detection. The second fluidic assembly 208 further includes an outlet port in parallel with the column that is connectable to a fluidic channel (not shown) which brings fluid from the column to a mass spectrometer (not shown). It should be understood that in such an arrangement, the post column additional solvent tubing 207 is an option and not required.

Further, like the clamp assembly 100, the clamp assembly 200 includes an inlet heater 218 through which an inlet tube 220 provides fluid that has passed through the chromatography column 116 to the downstream portion of the fluidic system. However, the clamp assembly 200 includes a track 202 and stop mechanism 212 for locking the carriage 206 to the track 202 that is different from the track 102 and lock mechanism 112 of the clamp assembly 100.

Figure 11:
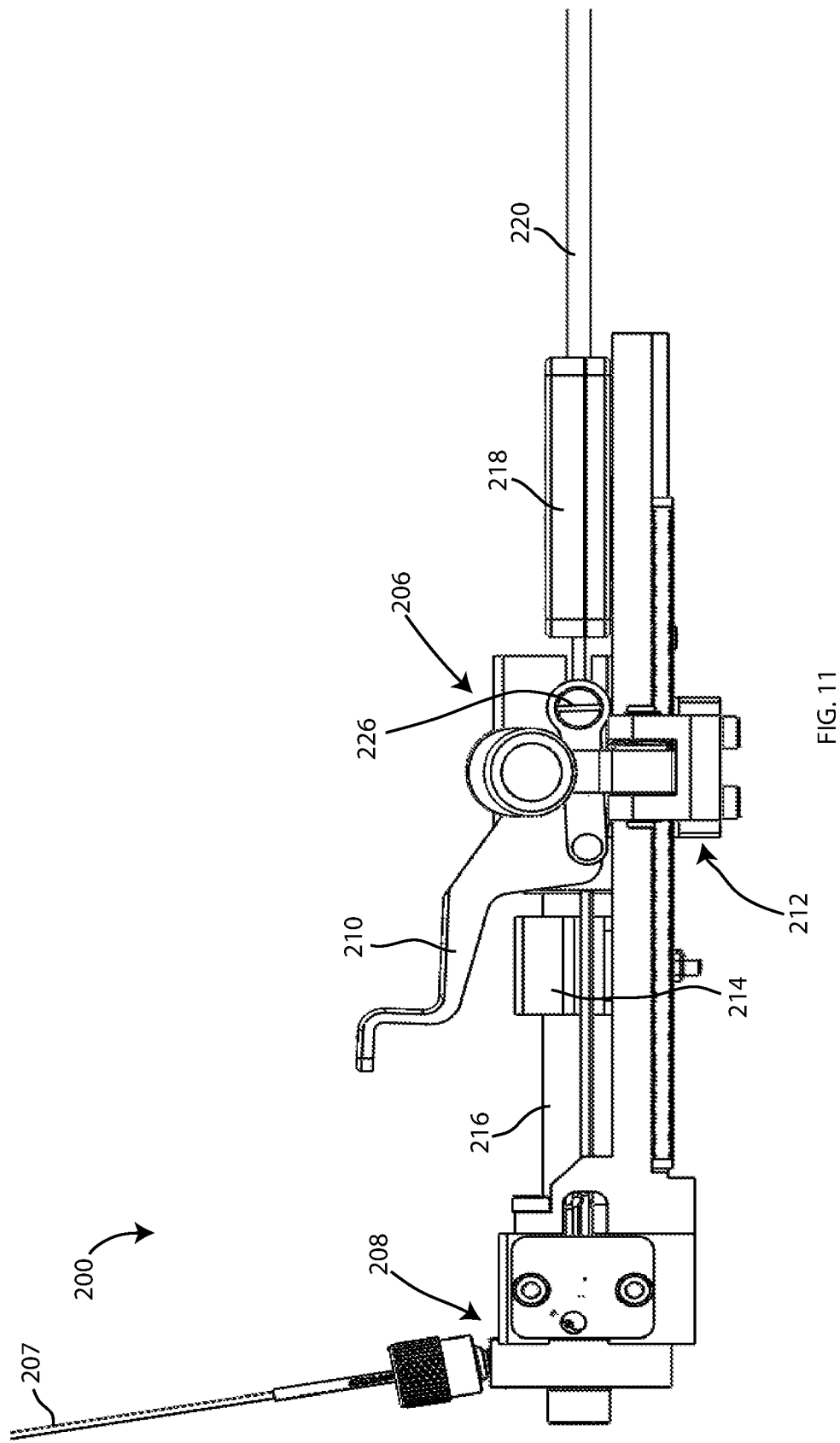
FIG. 11 depicts a side view of the clamp assembly of FIG. 10 with the clamp lever in a load position, in accordance with one embodiment.

FIG. 11 depicts a side view of the clamp assembly of FIG. 10 with the clamp lever in a load position, in accordance with one embodiment. Specifically, the lever 210 has been rotated counter-clockwise about a pin 226. This rotating action may be accomplished by a technician by hand. Actuating the lever 210 brings the first fluidic assembly 204 into contact with the outlet end of the chromatography column 216, thereby creating a fluid tight seal between the first fluidic assembly 204 and the chromatography column 216. Further, this rotation and actuation may simultaneously bring the chromatography column 216 into contact with the second fluidic assembly 208, thereby creating a fluid tight seal between, the chromatography column 216 and the second fluidic assembly 208.

Figure 12:
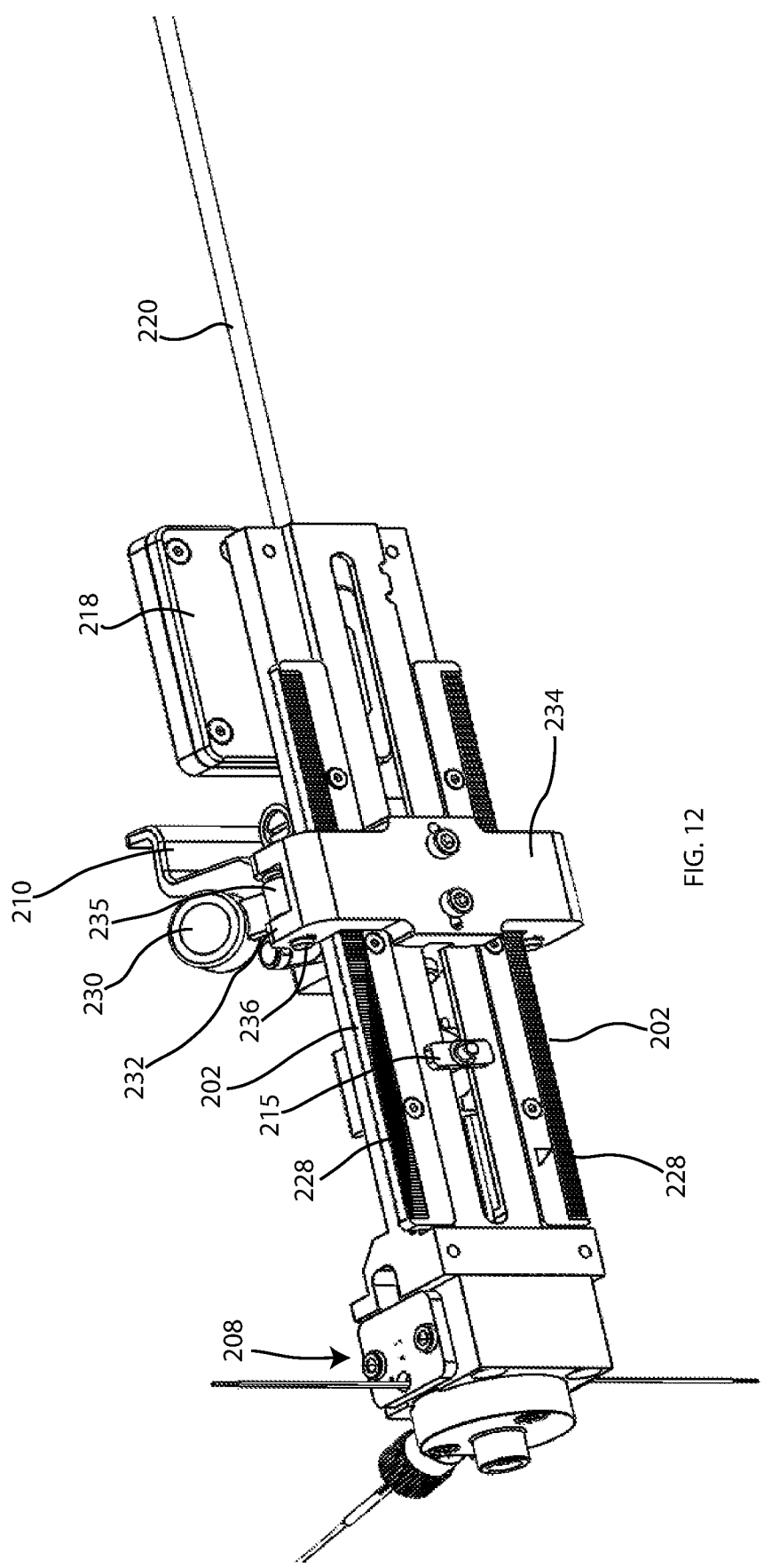
FIG. 12 depicts a perspective view of an underside of the clamp assembly of FIGS. 10-11, in accordance with one embodiment.

FIG. 12 depicts a perspective view of an underside of the clamp assembly of FIGS. 10-11, in accordance with one embodiment. As shown, the clamp assembly 200 includes the stop mechanism 212 having a hand button 230 for rotating a position retaining pawl 235 about a horizontal pin 236 extending through both the position retaining pawl 235 and a U-shaped structure 232 of a frame 234. The frame 234 extends underneath between each side of the dual rail structure of the rail 202. The frame 234 includes the U-shaped structure 232 on each side through which the horizontal pin 236 extends and about which the retaining pawl 235 rotates. The U-shaped structure includes openings in the left and right side, which receive the horizontal pin 236. The retaining pawl 235 is configured to rotate about the horizontal pin 236 in this manner. When the button 230 is pressed, the pawl 235 rotates about the vertical pin 236 to release an engagement arm (shown in FIG. 13), having an array of locking teeth (shown in FIG. 13) for engagement with the array of teeth disposed along the bottom of rail plate 228. When the button 130, is pressed, this allows the carriage 206 to slide along the rail 202. While not shown in this view, it should be understood that the structure of the lock mechanism 212 is mirrored on the other side of the dual rail 202. Thus, each of the hand button 230, retaining pawl 235, horizontal pin 236, and u-shaped structure 232 are included on the opposite side of the rail 202 hidden from the view shown in FIG. 12 in the same configuration.

Further shown in this view is a clamp mechanism 215, similar or the same as the clamp mechanism 115, that includes bolt extending through a flat thin plate extending on both sides of the bolt to each of the sides of the rail 202. The plate and bolt create the clamp 215 configured to selectively loosen and tighten the sliding retainer clip 214 to allow the retainer clip 214 to be positioned along the rail 102 in accordance with the size of the column is being accommodated by the clamp assembly 200.

Figure 13:
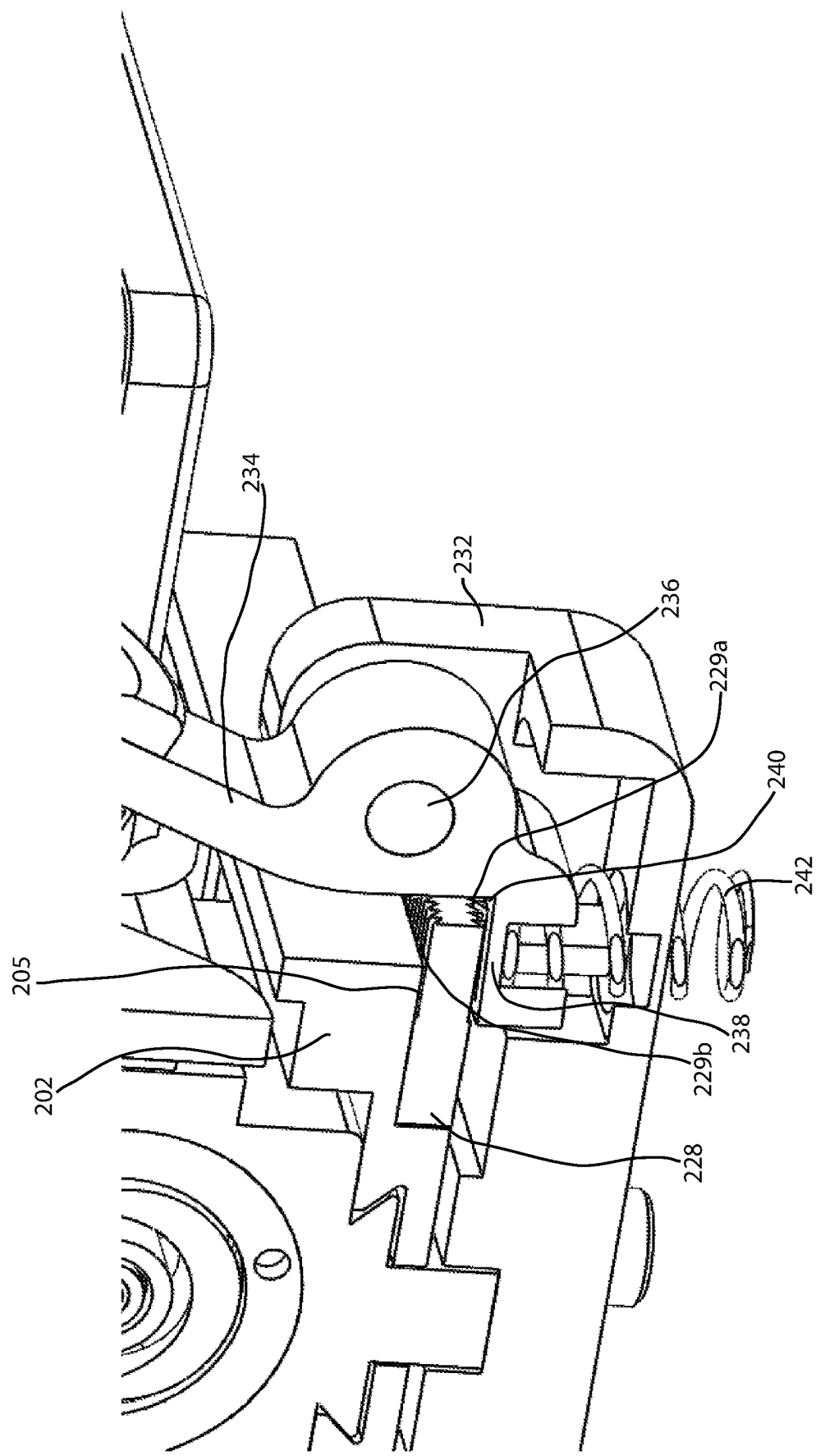
FIG. 13 depicts an enlarged view of a stop mechanism of the clamp assembly of FIGS. 10-11, in accordance with one embodiment.

FIG. 13 depicts an enlarged view of a stop mechanism 212 of the clamp assembly 100 of FIGS. 10-11, in accordance with one embodiment. As shown, the stop mechanism 212 includes the retaining pawl 235 rotating about the horizontal pin 236 which extends through the structure of the frame 234. The retaining pawl 235 extends to an engagement arm 238 having an array of locking teeth 240 upwardly disposed thereon. The locking teeth 240 are configured to engage with bottom teeth 229a of the rail plate 228. Top teeth 229b of the rail plate 228 are configured to engage with a bottom surface 205 of the rail 202. This bottom surface 205 may or may not have teeth to engage with the top teeth 229b. The engagement arm 238 is shown including a cavity, bore or hallow for receiving a spring 242. The spring 242 may be configured to put upward pressure on the engagement arm 238 in order to maintain locking of the upward facing locking teeth 240 of the engagement arm with the downward facing teeth 229a of the rail plate 228. The rail plate 228 may be a removable and replaceable component of the rail 202, in the event that the teeth thereon become warn.

Thus, to disengage and remove the carriage 206 from the rail 202, a technician would squeeze both buttons 230 of the stop mechanism 212. This would rotate the pawl 235 about the pin 236 in a counterclockwise direction. The engagement arm 238 would then separate from the rail plate 228. This disengages the carriage 206 from the rail 202 so that the carriage can be freely slid axially along the rail 202 while the buttons 230 are pressed. When the buttons 230 are released, the pawl 235 rotates clockwise about the pin 236 due to the spring force from the spring 242, thereby re-engaging the engagement arm 238 with the rail plate 228.

Although a few implementations and methods have been described in detail above, other modifications are possible. In certain implementations, fitting adapters can be provided for converting chromatography columns with conventional ferrule type fitting connections. Although a clamp assembly has been described for use in a column enclosure, in some implementations, the clamp assembly may alternatively or additionally be configured for use in a column manager, such as the ACQUITY UPLC® Column Manager available from Waters Corporation of Milford MA.

While the invention has been shown and described with reference to specific embodiments, it should be understood by those skilled in the art that various changes in form and detail may be made therein without departing from the spirit and scope of the invention as recited in the accompanying claims.

What is claimed is:

1. A column enclosure for a chromatography column comprising:
   a column housing extending along a length;
   a rail extending along the length within the column housing;
   a carriage movably attachable to the rail such that the carriage moves along the rail, the carriage including an actuator and a stop mechanism;
   a first fluidic assembly configured to be moved by the actuator into engagement with a chromatography column received within the column housing; and
   a second fluidic assembly located proximate an end of the rail;
   wherein the stop mechanism is configured to selectively prevent and allow movement of the carriage relative to the rail, wherein the stop mechanism is configured to be independently operable from the actuator, and wherein the actuator is configured:
      to establish a first fluid tight seal between the first fluidic assembly and the chromatography column; and
      to establish a second fluid tight seal between the second fluidic assembly and the chromatography column,
   wherein the rail is a guide rod and wherein the carriage includes a bore through which the guide rod extends, wherein the carriage is configured to be rotated about the guide rod to move the carriage into and out of a plurality of separate locations along the rail.

2. The column enclosure for a chromatography column of claim 1, wherein the stop mechanism includes a projection on the carriage keyed to the plurality of separate locations along the rail, each of the plurality of separate locations corresponding to standard lengths of chromatography columns.

3. The column enclosure for a chromatography column of claim 1, wherein the actuator is a hand operated cam loaded lever.

4. The column enclosure for a chromatography column of claim 1, wherein the rail includes a first plurality of teeth arranged along the length, and wherein the stop mechanism includes a first lock pawl that is configured to engage the teeth of the rail, thereby to inhibit movement of the carriage relative to the rail.

5. The column enclosure for a chromatography column of claim 4, wherein the rail includes a second plurality of teeth arranged along the length on an opposite side of the first plurality of teeth, and wherein the stop mechanism includes a second lock pawl on an opposite side of the carriage as the first lock pawl, wherein the first and second lock pawls are each configured to engage the teeth of the rail, thereby to inhibit movement of the carriage relative to the rail.

6. The column enclosure for a chromatography column of claim 5, wherein a spring extends between each of the first and second lock pawls to maintain locking of the stop mechanism.

7. The column enclosure for a chromatography column of claim 6, wherein the lock pawls are configured to be squeezed by hand to release the stop mechanism from the first and second plurality of teeth of the rail and thereby allow movement of the carriage with respect to the rail.

8. The column enclosure for a chromatography column of claim 1, wherein the column enclosure accommodates chromatography columns having at least one of various column lengths and various column diameters.

9. A clamp assembly comprising:
a rail extending along a length and configured to receive a first fluidic assembly; and
a carriage movably attachable to the rail such that the carriage moves along the rail, the carriage configured to receive a second fluidic assembly, the carriage including an actuator and a stop mechanism,
where the stop mechanism is configured to selectively prevent and allow movement of the carriage relative to the rail, wherein the stop mechanism is configured to be independently operable from the actuator assembly, and wherein the actuator is configured:
to move a chromatography column received by the clamp assembly relative to the rail to create a first fluid tight seal between the chromatography column and the first fluidic assembly, and
move the second fluidic assembly relative to the carriage body to create a second fluid tight seal between the second fluidic assembly and the chromatography column,
wherein the rail includes a first plurality of teeth arranged along the length, and wherein the stop mechanism includes a first lock pawl that is configured to engage the teeth of the rail, thereby to inhibit movement of the carriage relative to the rail, wherein the stop mechanism includes a second lock pawl on an opposite side of the carriage as the first lock pawl, and wherein a spring extends between each of the first and second lock pawls to maintain locking of the stop mechanism.

10. The clamp assembly of claim 9, wherein the stop mechanism includes a projection on the carriage keyed to a plurality of separate locations along the rail, each of the plurality of separate locations corresponding to standard lengths of chromatography columns.

11. The clamp assembly of claim 10, wherein the rail is a guide rod and wherein the carriage includes a bore through which the guide rod extends, wherein the carriage is configured to be rotated about the guide rod to move the carriage into and out of the plurality of separate locations along the rail.

12. The clamp assembly of claim 9, wherein the actuator is a hand operated cam loaded lever.

13. The clamp assembly of claim 9, wherein the rail includes a second plurality of teeth arranged along the length on an opposite side of the first plurality of teeth, wherein the first and second lock pawls are each configured to engage the teeth of the rail, thereby to inhibit movement of the carriage relative to the rail.

14. The clamp assembly of claim 9, wherein the lock pawls are configured to be squeezed by hand to release the stop mechanism from the first and second plurality of teeth of the rail and thereby allow movement of the carriage with respect to the rail.

15. The clamp assembly of claim 9, wherein the carriage accommodates chromatography columns having at least one of various column lengths and various column diameters.

16. A column enclosure for a chromatography column comprising:
a column housing extending along a length;
a rail extending along the length within the column housing;
a carriage movably attachable to the rail such that the carriage moves along the rail, the carriage including an actuator and a stop mechanism;
a first fluidic assembly configured to be moved by the actuator into engagement with a chromatography column received within the column housing; and
a second fluidic assembly located proximate an end of the rail;
wherein the stop mechanism is configured to selectively prevent and allow movement of the carriage relative to the rail, wherein the stop mechanism is configured to be independently operable from the actuator, and wherein the actuator is configured:
to establish a first fluid tight seal between the first fluidic assembly and the chromatography column; and
to establish a second fluid tight seal between the second fluidic assembly and the chromatography column,
wherein the rail includes a first plurality of teeth arranged along the length, and wherein the stop mechanism includes a first lock pawl that is configured to engage the teeth of the rail, thereby to inhibit movement of the carriage relative to the rail, wherein the stop mechanism includes a second lock pawl on an opposite side of the carriage as the first lock pawl, and wherein a spring extends between each of the first and second lock pawls to maintain locking of the stop mechanism.

17. The column enclosure for a chromatography column of claim 16, wherein the rail includes a second plurality of teeth arranged along the length on an opposite side of the first plurality of teeth, wherein the first and second lock pawls are each configured to engage the teeth of the rail, thereby to inhibit movement of the carriage relative to the rail.

18. A clamp assembly comprising:
a rail extending along a length and configured to receive a first fluidic assembly; and
a carriage movably attachable to the rail such that the carriage moves along the rail, the carriage configured to receive a second fluidic assembly, the carriage including an actuator and a stop mechanism,
where the stop mechanism is configured to selectively prevent and allow movement of the carriage relative to the rail, wherein the stop mechanism is configured to be independently operable from the actuator assembly, and wherein the actuator is configured:
to move a chromatography column received by the clamp assembly relative to the rail to create a first fluid tight seal between the chromatography column and the first fluidic assembly, and
move the second fluidic assembly relative to the carriage body to create a second fluid tight seal between the second fluidic assembly and the chromatography column,
wherein the rail is a guide rod and wherein the carriage includes a bore through which the guide rod extends, wherein the carriage is configured to be rotated about the guide rod to move the carriage into and out of a plurality of separate locations along the rail.

19. The clamp assembly of claim 18, wherein the stop mechanism includes a projection on the carriage keyed to the plurality of separate locations along the rail, each of the plurality of separate locations corresponding to standard lengths of chromatography columns.

* * * * *